(12) United States Patent
PeQueen

(10) Patent No.: US 8,971,698 B2
(45) Date of Patent: *Mar. 3, 2015

(54) DETACHABLE VIEWFINDER

(71) Applicant: Earl J PeQueen, Watsonville, CA (US)

(72) Inventor: Earl J PeQueen, Watsonville, CA (US)

(*) Notice: Subject to any disclaimer, the term of this patent is extended or adjusted under 35 U.S.C. 154(b) by 24 days.

This patent is subject to a terminal disclaimer.

(21) Appl. No.: 13/964,804

(22) Filed: Aug. 12, 2013

(65) Prior Publication Data

US 2013/0330069 A1 Dec. 12, 2013

Related U.S. Application Data

(63) Continuation of application No. 13/413,221, filed on Mar. 6, 2012, now Pat. No. 8,509,612.

(51) Int. Cl.
| | | |
|---|---|---|
| G03B 11/00 | (2006.01) | |
| G03B 13/02 | (2006.01) | |
| G03B 17/56 | (2006.01) | |
| H04N 5/225 | (2006.01) | |
| G03B 17/06 | (2006.01) | |
| G03B 17/12 | (2006.01) | |

(52) U.S. Cl.
CPC .............. *G03B 13/02* (2013.01); *G03B 17/568* (2013.01); *H04N 5/2251* (2013.01); *G03B 17/56* (2013.01); *G03B 17/06* (2013.01); *G03B 17/12* (2013.01)
USPC .......................................... 396/544; 396/148

(58) Field of Classification Search
CPC ....................................................... G02B 7/02
USPC .......... 354/219, 222; 396/141, 148, 373–386, 396/544; 399/544
See application file for complete search history.

(56) References Cited

U.S. PATENT DOCUMENTS

| | | | | | |
|---|---|---|---|---|---|
| 2,420,252 | A | * | 5/1947 | Land | 359/428 |
| 3,620,148 | A | * | 11/1971 | La Rocco et al. | 96/24 |
| 4,437,753 | A | * | 3/1984 | Dunn | 396/420 |
| 5,809,355 | A | * | 9/1998 | Lungershausen et al. | 396/319 |
| 7,006,143 | B1 | * | 2/2006 | Silverbrook | 348/373 |
| 7,184,086 | B2 | * | 2/2007 | Tamura | 348/333.06 |
| 7,588,376 | B2 | * | 9/2009 | Friedrich | 396/419 |
| D606,108 | S | * | 12/2009 | Feinbloom et al. | D16/220 |
| 8,213,788 | B2 | * | 7/2012 | Soll et al. | 396/373 |
| 8,509,612 | B1 | * | 8/2013 | PeQueen | 396/544 |
| 2009/0046376 | A1 | * | 2/2009 | Westerweck et al. | 359/698 |
| 2009/0109558 | A1 | * | 4/2009 | Schaefer | 359/827 |
| 2009/0321593 | A1 | * | 12/2009 | Foddis | 248/187.1 |
| 2012/0062691 | A1 | * | 3/2012 | Fowler et al. | 348/36 |
| 2012/0134662 | A1 | * | 5/2012 | Soll et al. | 396/544 |
| 2012/0189297 | A1 | * | 7/2012 | Feinbloom et al. | 396/544 |
| 2012/0301128 | A1 | * | 11/2012 | Feinbloom et al. | 396/373 |

* cited by examiner

*Primary Examiner* — Clayton E LaBalle
*Assistant Examiner* — Kevin Butler
(74) *Attorney, Agent, or Firm* — Donald R. Boys; Central Coast Patent Agency, Inc.

(57) ABSTRACT

A viewfinder for attaching to a device having image-capturing capability has a structure for supporting an eyepiece, an engagement interface implemented on the structure to engage a complementary portion of a device having image-capture capability in a specific direction, and at least one eyepiece attached to the structure, such that the eyepiece has an axis proceeding in the specific direction with the viewfinder engaged to the device having image-capture capability.

16 Claims, 4 Drawing Sheets

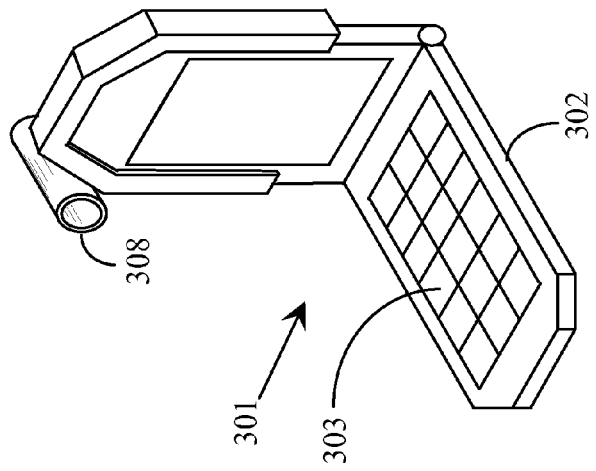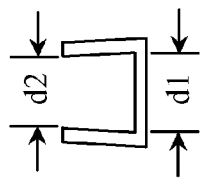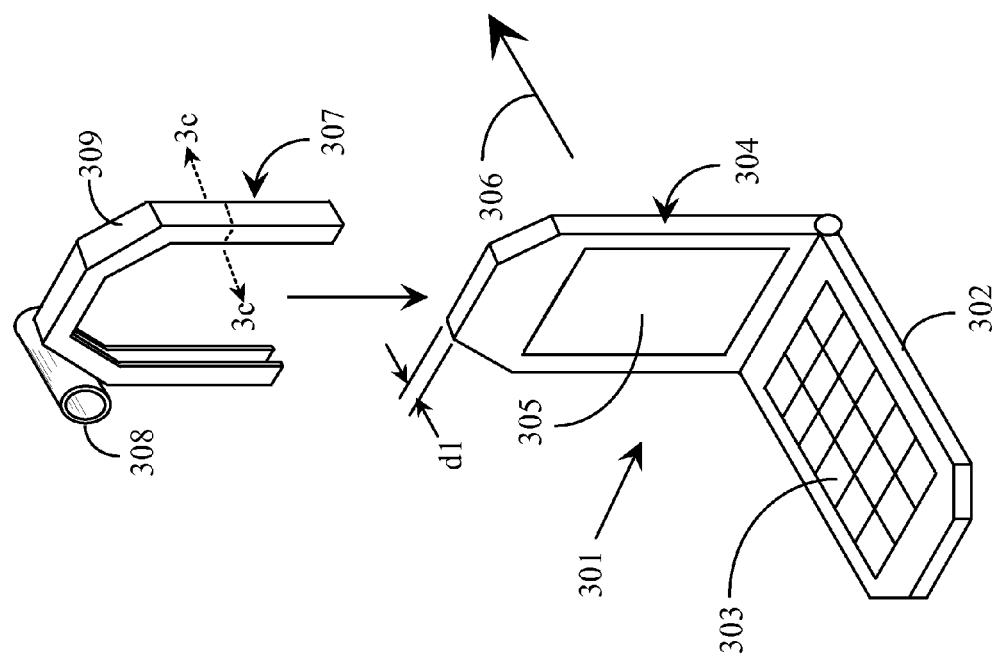

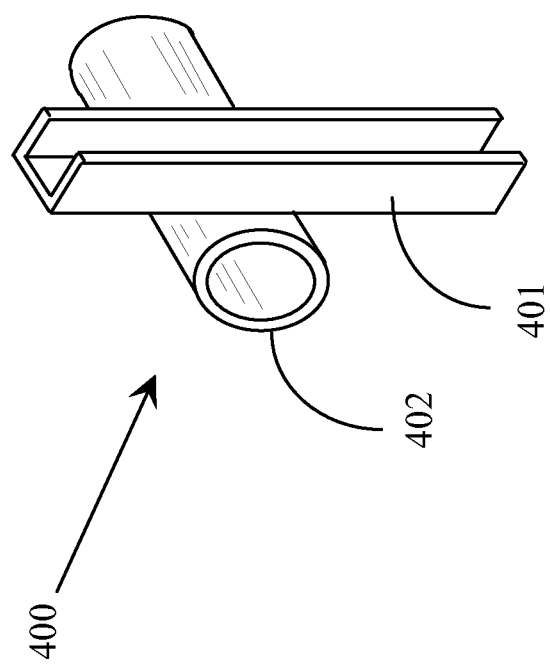

DETACHABLE VIEWFINDER

CROSS-REFERENCE TO RELATED APPLICATIONS

The present patent application is a continuation of pending application Ser. No. 13/413,221, filed on Mar. 6, 2012, entitled, "Detachable Viewfinder", disclosure of which is incorporated herein in its entirety by reference.

BACKGROUND OF THE INVENTION

1. Field of the Invention

The present invention is in the technical field of image-capturing devices, such as cameras, and pertains more particularly to detachable viewfinders for such devices.

2. Description of Related Art

Since the advent of digital imaging, image-capture ability has been added to more and more devices. At the time of filing this patent application there is a very broad selection of commercially-available digital cameras, and most cellular telephones have digital image-capture ability. In the case of many digital cameras and cell phones, one may refer to the digital display to see what the camera will capture as a still or as video frames if the camera function is activated, typically by operating a button switch. The digital display, however is sometimes a bit clumsy to see while training the camera lens on a scene to capture, and in the case of bright sunlight, for example, may be difficult to see. Many devices have a viewfinder, but there are many that do not, in particular a lot of cellular telephones that include a digital camera. What is clearly needed is a detachable viewfinder for such devices, that may be added at times of need, and may be detached when not needed.

BRIEF SUMMARY OF THE INVENTION

In one embodiment of the present invention a viewfinder for attaching to a device having image-capturing capability is provided, comprising a structure for supporting an eyepiece, an engagement interface implemented on the structure to engage a complementary portion of a device having image-capture capability in a specific direction, and at least one eyepiece attached to the structure, such that the eyepiece has an axis proceeding in the specific direction with the viewfinder engaged to the device having image-capture capability.

In one embodiment the eyepiece is a linear element having a length and an opening having an axis through the length. Also in one embodiment the eyepiece is a cylinder. In another embodiment the structure has a linear portion with a central slot through which a threaded fastener may pass to engage a threaded hole in a camera body, and the eyepiece is attached to one end of the linear portion, the slot allowing the eyepiece to be positioned at variable distance from the camera body.

In an alternative embodiment the structure has a linear portion with a central slot through which a threaded fastener may pass to engage a threaded hole in a camera body, and the eyepiece is attached to an end of an extension proceeding at a right angle from one end of the linear portion, the slot allowing the eyepiece to be positioned at variable distance from the camera body.

In another alternative embodiment the structure for supporting an eyepiece comprises a linear portion having a base and sidewalls forming a groove, the sidewalls angled inward from the base to provide a gripping effect when engaging a planar portion of a device. In some cases the structure for supporting an eyepiece has more than one linear portion having a base and sidewalls forming a groove, the linear portions joined at angles such that the grooved structure may envelop a portion of the planar portion of a device. There may also be a gripping mechanism associated with the groove, for applying pressure to the planar portion when engaged.

In another aspect of the invention a method for adding a viewfinder to a device having image-capturing capability is provided, comprising the steps of (a) forming a structure for supporting an eyepiece; (b) implementing an engagement interface on the structure to engage a complementary portion of the device; and (c) attaching at least one eyepiece to the structure, such that the eyepiece has an axis proceeding in the specific direction with the viewfinder engaged to the device having image-capture capability.

In one embodiment of the method the eyepiece is a linear element having a length and an opening having an axis through the length. Also in one embodiment the eyepiece is a cylinder.

In one embodiment the structure has a linear portion with a central slot through which a threaded fastener may pass to engage a threaded hole in a camera body, and the eyepiece is attached to one end of the linear portion, the slot allowing the eyepiece to be positioned at variable distance from the camera body. In another embodiment the structure has a linear portion with a central slot through which a threaded fastener may pass to engage a threaded hole in a camera body, and the eyepiece is attached to an end of an extension proceeding at a right angle from one end of the linear portion, the slot allowing the eyepiece to be positioned at variable distance from the camera body.

In yet another alternative the structure for supporting an eyepiece comprises a linear portion having a base and sidewalls forming a groove, the sidewalls angled inward from the base to provide a gripping effect when engaging a planar portion of a device. Further there may be more than one linear portion having a base and sidewalls forming a groove, the linear portions joined at angles such that the grooved structure may envelop a portion of the planar portion of a device. In some cases a gripping mechanism associated with the groove, for applying pressure to the planar portion when engaged.

BRIEF DESCRIPTION OF THE SEVERAL VIEWS OF THE DRAWINGS

FIG. 3a is a perspective view of a folding, or "flip" phone with a detachable viewfinder in an embodiment of the present invention.

FIG. 3b shows the phone and viewfinder of FIG. 3a fully engaged.

FIG. 3c is a cross-section through a portion of the structure of the viewfinder in FIG. 3a.

FIG. 4 illustrates another viewfinder in an embodiment of the present invention.

DETAILED DESCRIPTION OF THE INVENTION

Figure 1:
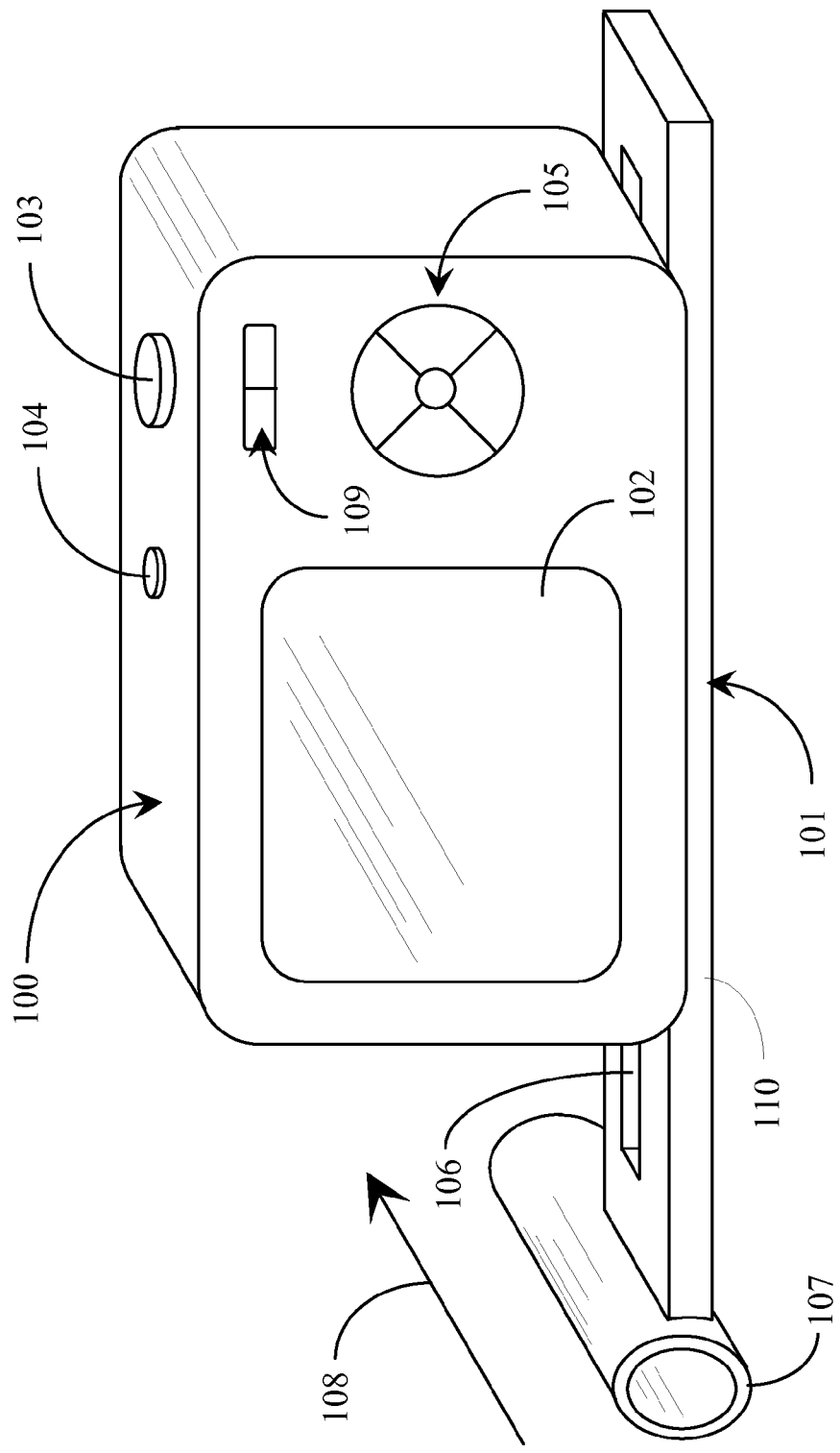
FIG. 1 is a perspective view of a digital camera with a detachable viewfinder according to one embodiment of the present invention.

FIG. 1 is a perspective view of a digital camera 100 with a detachable viewfinder 101 according to one embodiment of the present invention. Camera 100 in this example is directed for image capture in the direction of arrow 108, and has a button 103 for activating capture of a still image or for initiating frame capture for video. A smaller button 104 is for extending a lens mechanism, not shown as it is on the opposite side of the camera. There is in addition a button set 109 for zooming in or out with the lens mechanism. A button set 105 is for moving a cursor in a digital display 102 or for moving left, right, up or down among menu selections.

Detachable viewfinder 101 in this example has a long body 110 with a lengthwise slot 106 for engaging camera 100 by a threaded hole in the bottom of the camera (not shown) which is provided in the camera for attaching the camera to a tripod assembly. A thumb screw passes from below through slot 106 and is threaded into the threaded hole in the bottom of the camera.

A cylindrical eyepiece 107 is attached to body 106 at one end such that the axis of the cylinder is generally in the direction of arrow 108. This attachment may be by welding or soldering, for example, or by other conventional means. In some cases the angle of the cylinder of the cylinder of the eyepiece may be angled slightly vertically and horizontally to account for parallax so that the eyepiece cylinder and the camera lens may intersect at a desired distance. In some cases the cylindrical eyepiece may be adjustable in angle over a small rotational range so parallax may be adjusted as well.

In some embodiments the cylindrical eyepiece may be attached at the end of body 110 opposite to that shown in FIG. 1. In some other embodiments there may be a cylindrical eyepiece attached at both ends of the body, and the user may choose which eyepiece to use.

It will be apparent to the skilled person that the representation of a digital camera in FIG. 1 is exemplary only, and is meant to represent a range of different devices, many of which will have features different than those shown in this example. The camera represented is meant to represent any such camera or other image capturing device that has a threaded hole in the base for attaching to a tripod, as is common among such devices. The device need not be digital.

It will also be apparent to the skilled person that the length of body 110 and of slot 106 may vary considerably in different versions of a detachable viewfinder, allowing the cylindrical eyepiece to be set at varying distances from the camera to which it joined. Further cylindrical eyepiece 107 may vary in outside and inside diameter, and in length. In some cases the eyepiece is a simple mechanical cylinder, but in other cases there may be lenses in the cylinder. In other cases the eyepiece may be other than cylindrical, such as square or rectangular in cross-section. There are many possibilities.

Figure 2:
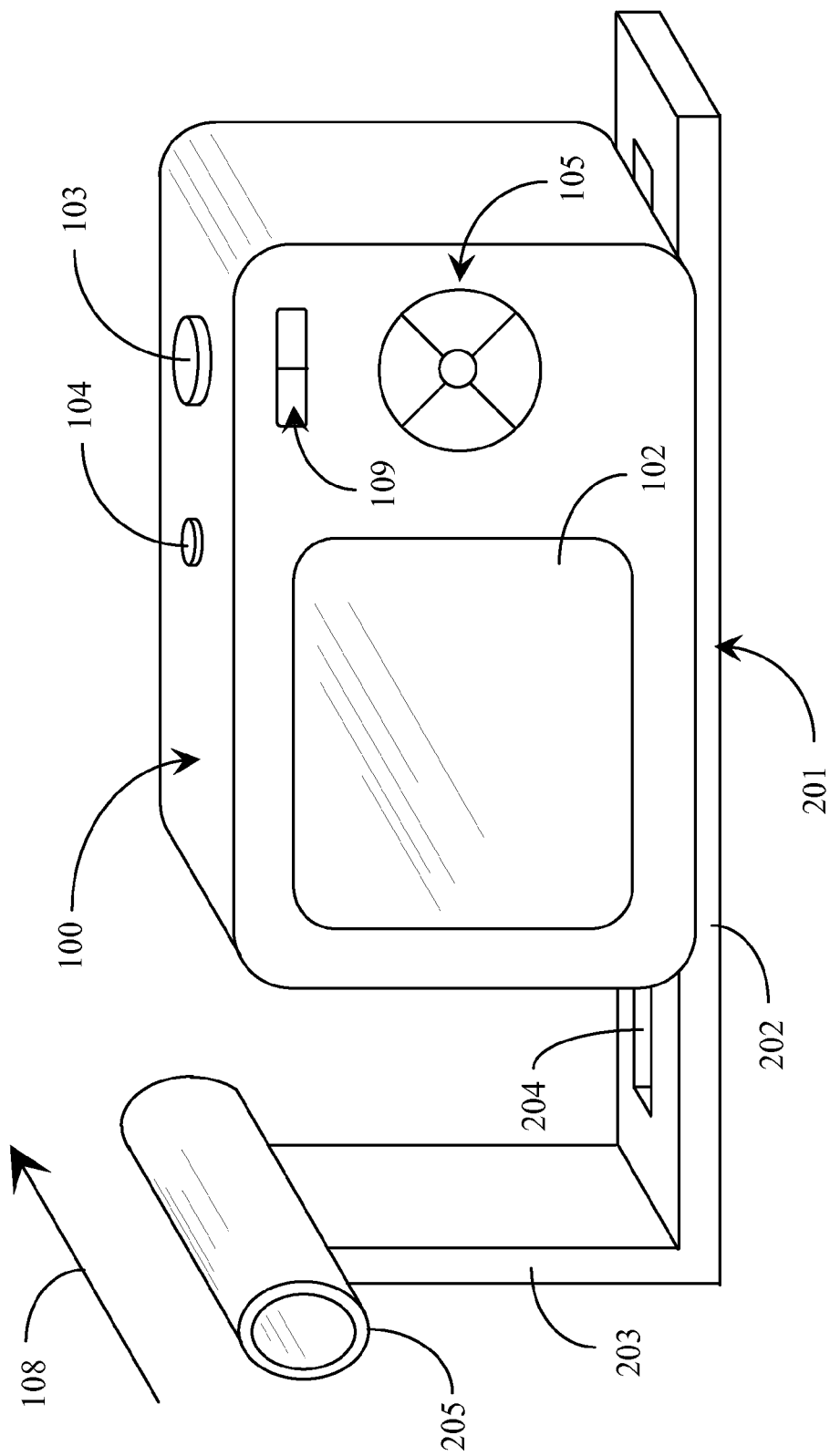
FIG. 2 is a perspective view of a digital camera with a detachable viewfinder according to another embodiment of the present invention.

FIG. 2 is a perspective view of a digital camera 100 with a detachable viewfinder 201 according to another embodiment of the present invention. Camera 100 is the same as in FIG. 1, and is meant to represent any image-capturing device that has a threaded hole in the base for attaching to a tripod.

Detachable viewfinder 201 has an extended base 202 with a lengthwise slot 204 for engaging camera 100. A second extension 203 proceeds at substantially a right angle to base 202 in this example, and a cylindrical eyepiece 205 is attached at an upper end of extension 203. The right-angle extension allows eyepiece 205 to present at a different aspect relative to the lens mechanism (not shown) of camera 100, and to afford a different geometry for a user. As described with reference to FIG. 1, the eyepiece may have other shape than the cylinder shown, and may be mechanical, or may have lenses. The height of extension 203 may differ in different embodiments, and the angle of extension 203 with base 202 may be other than ninety degrees. The length of base 202 and slot 204 may be different in different embodiments, such that the eyepiece might be immediately adjacent the camera, or at some distance from the camera. As before, the angle of attachment of the eyepiece to extension 203 may vary to adjust for parallax. In some cases extension 203 and base 202 may be joined by fasteners, and therefore detachable as well, and the eyepiece might be joined to either upward extension 203, or to base 202. In some cases there may be an upward extension 203 at either end, or both ends, of base 202, and there may be two eyepieces.

FIG. 3a is a perspective view of a folding, or "flip" phone 301, with a detachable viewfinder 307 in an embodiment of the present invention. The detachable viewfinder in this example is shown detached above the flip phone, with an arrow showing the direction of engagement. FIG. 3B shows phone 301 with the viewfinder fully engaged.

Referring back to FIG. 3a, phone 301 has a base 302 with an I/O keypad 303 as is known in the art, and a folding portion 304 having a display 305 as is also known in the art. Viewfinder 307 in this embodiment has a U-shaped structure 309 formed in a manner to engage the upper part of folding portion 304 of phone 301. FIG. 3c is a cross-section through structure 309 taken along line 3c-3c in FIG. 3a. In one embodiment the side panels of the groove are angled slightly inward as shown, such that d1 in FIG. 3 is d1 in FIG. 3a, that is, the thickness of folding portion 304; but d2 in FIG. 3 is somewhat less than d1 due to the slight inwardly angled sidewalls of the groove.

In many embodiments folding portion 304 is molded of a plastic material that is flexible when finished, such that, as viewfinder 307 engages folding portion 304 the sidewalls that are separated at the dimension d2 expand to d1 so that the engagement may take place, and the flexing of the material provides a force against the opposite surfaces of folding portion 304 to hold the viewfinder in place once engaged.

Viewfinder 307 has an eyepiece 308 attached at a convenient location as shown in FIG. 3a, such that with the viewfinder engaged to the folding portion the eyepiece is convenient for the user to see the field that will be captured when the camera is triggered to capture an image. As described above, eyepiece 308 may be joined to structure 309 at an angle to account for parallax. Further, in some embodiments the eyepiece may be adjustable for this angle if needed, and in some embodiments the eyepiece may be moved from one location to another on structure 307. Further, there may be more than one eyepiece, and the eyepiece need not be cylindrical as shown, but may have other shape, and in some cases may have a lens or lenses as well.

Further to the above, in some cases upper portion 304 of phone 301 may have one or more buttons or connectors in the edge region that might be covered when the viewfinder is engaged. In some cases structure 307 may be molded to provide openings for such connectors or buttons. In some cases one viewfinder may serve for two or more telephones, but some telephones may require a dedicated detachable viewfinder, which may be bundled with the phone when sold, or purchased separately.

It will be apparent to the skilled person that viewfinder 307 may engage telephones and/or other devices including image-capture mechanisms and systems, other than flipphones as shown. It will further be apparent that the same principles may be used to provide a viewfinder with an eyepiece attached to a single straight piece of molded material, such as is shown in FIG. 4, which illustrates a viewfinder 400 according to an embodiment of the invention, having a straight grooved portion 401 and an attached eyepiece 402. This embodiment is more universally adaptable to various existing commercial devices that have image-capture capability, because only one edge of such a device need be engaged. In this version as in others, the eyepiece may be cylindrical, as shown, or may have other shape or have lenses.

In one version of the detachable viewfinder 400, the width at the bottom of the groove is made rather large, and the angle of one or both sidewalls inward is made rather more acute than as shown in FIG. 3c, so the one viewfinder might be used an a variety of devices of varying thickness. Further still, the length of portion 401 may be rather short, such as 0.5 inches, so there is a greater freedom of placement along the edge of a device to which the viewfinder may be engaged.

It will be apparent to the skilled artisan that the viewfinders taught in the disclosure above and the several figures provided may be manufactured of a variety of materials, and may be made in a variety of geometries as well, without departing from the spirit and scope of the invention. Further, the attachment mechanisms taught may have broader implementation as well. For example, referring to FIG. 4, rather than have angled sidewalls that may be flexed, a straight grooved portion may be provided with a spring-loaded mechanism to grip the thickness of a device having image-capture capability. In some embodiments there may be additional material added at the surfaces where a mechanism impinges on the surface of a telephone or other device. Such material, for example, may be such as to prevent marking or marring the surface of the device, or may be to enhance the gripping capability. Material may also be added for aiding the grip of the person using the device with the detachable viewfinder. There are many possibilities.

The invention claimed is:

1. A viewfinder for attaching to a device having image-capturing capability, comprising:
    a structure for supporting an eyepiece, the structure having a linear portion having a base and sidewalls angled inward from the base to provide a gripping effect when engaging a planar portion of the device having image-capturing capability;
    a through opening in the base enabling passage of a screw fastener to join the base to the device having image-capturing capability at a threaded opening provided for tripod mount; and
    at least one eyepiece attached to the structure, such that the eyepiece has an axis proceeding in substantially a same direction as a viewfinder of the device having image-capture capability.

2. The viewfinder of claim 1 wherein the through opening in the base is a slot extending in a direction of a length of the base, enabling the base to be poisoned at a variety of positions relative to the device having image-capturing capability.

3. The viewfinder of claim 1 wherein the device having image-capturing capability is a hand-held camera and spacing between the sidewalls is controlled to match a width of the device having image-capturing capability.

4. The viewfinder of claim 1 wherein the eyepiece is a linear element having a length and an opening having an axis through the length.

5. The viewfinder of claim 4 wherein the eyepiece is a cylinder.

6. The viewfinder of claim 1 further comprising a vertical extension from the base at one end of the base, wherein the eyepiece is joined at an upper end of the vertical extension.

7. The viewfinder of claim 1 further comprising a gripping mechanism for applying pressure to the device having image-capturing capability when engaged.

8. The viewfinder of claim 7 wherein the gripping mechanism is a spring implemented mechanism.

9. A method for providing a viewfinder to a device having image capturing capability, comprising steps:
    (a) forming a structure for supporting an eyepiece, the structure having a linear portion having a base and sidewalls angled inward from the base to provide a gripping effect when engaging a planar portion of the device having image-capturing capability, a through opening in the base enabling passage of a screw fastener to join the base to the device having image capturing capability at a threaded opening provided for tripod mount, and at least one eyepiece attached to the structure, such that the eyepiece has an axis proceeding in substantially a same direction as a viewfinder of the device having image-capture capability;
    (b) engaging the structure to a base of the device having image-capturing capability; and
    (c) engaging the screw fastener, joining the viewfinder to the device having image-capturing capability.

10. The method of claim 9 wherein the through opening in the base is a slot extending in a direction of a length of the base, enabling the base to be poisoned at a variety of positions relative to the device having image-capturing capability.

11. The method of claim 9 wherein the device having image-capturing capability is a hand-held camera and spacing between the sidewalls is controlled to match a width of the device having image-capturing capability.

12. The method of claim 9 wherein the eyepiece is a linear element having a length and an opening having an axis through the length.

13. The method of claim 12 wherein the eyepiece is a cylinder.

14. The method of claim 9 further comprising a vertical extension from the base at one end of the base, wherein the eyepiece is joined at an upper end of the vertical extension.

15. The method of claim 9 further comprising a gripping mechanism for applying pressure to the device having image-capturing capability when engaged.

16. The method of claim 15 wherein the gripping mechanism is a spring-implemented mechanism.

* * * * *